No. 789,154. Patented May 9, 1905.

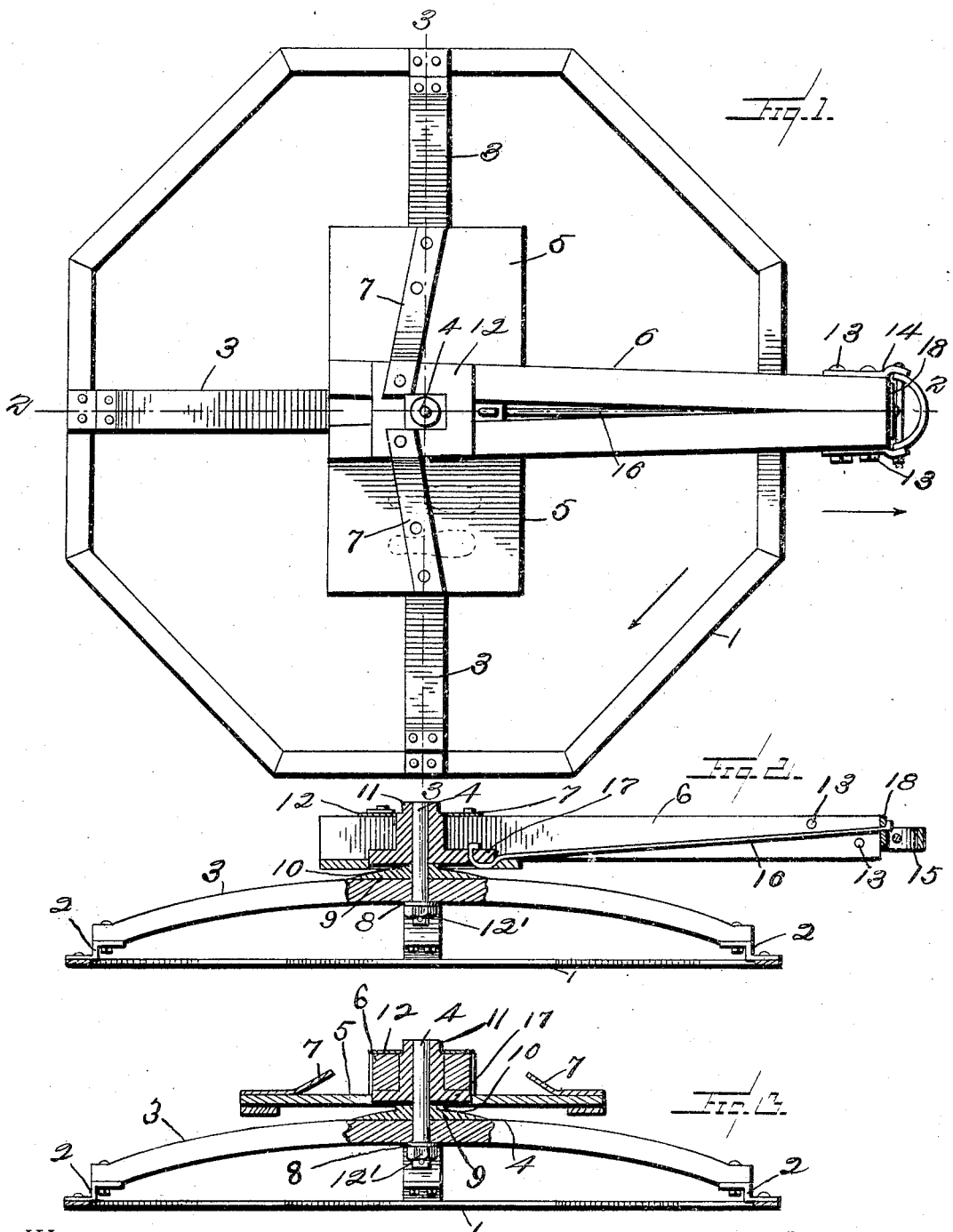

UNITED STATES PATENT OFFICE.

ARNOLD JAKEL, OF SHAW, OREGON.

WEEDER.

SPECIFICATION forming part of Letters Patent No. 789,154, dated May 9, 1905.

Application filed December 5, 1904. Serial No. 235,479.

*To all whom it may concern:*

Be it known that I, ARNOLD JAKEL, a citizen of the United States, residing at Shaw, in the county of Marion and State of Oregon, have invented certain new and useful Improvements in Weeders, of which the following is a specification, reference being had therein to the accompanying drawings.

My invention relates to weeders and scrapers, one of the objects being to provide a device of the character described that can be effectually used in removing weeds and undesirable growth from lands to be cultivated for crops and that can also be used in scraping summer fallow.

Another object is to provide a weeding and scraping device that shall be simple and inexpensive in construction, easy to operate, and effective in results.

Referring to the drawings accompanying the specification and made a part thereof, Figure 1 is a top plan. Fig. 2 is a section on line 2 2 of Fig. 1, and Fig. 3 is a section on line 3 3 of Fig. 1.

Like numerals of reference designate similar parts in the figures of the drawings.

1 designates a scraping and cutting tool, preferably made of a narrow strip of metal shaped to form an octagon, although any other shape may be used, if found necessary or desirable, and to the top of which are secured, by means of the angle-irons 2, the braces 3, forming a framework. The braces are preferably curved slightly upward in order to give plenty of intervening space between the ground and said braces, so that the weeds and other debris may pass easily over the top of the cutting-tool and not be collected within the framework. Pivotally mounted on said braces by means of the vertical shaft 4 is a platform 5, to which is secured the tongue 6, rigidly held in place by the braces 7. Secured to the braces underneath and at the junction thereof is a strengthening-plate 8, and rigidly secured to the top of said braces at said junction is a plate 9, having a raised central point 10. The tongue 6 is formed in two sections, as shown, one of said sections passing on each side of the boxing or journal 11 and held rigidly in place by means of the plate 12. By means of said boxing or jour-nal 11 the tongue 6 and the platform 5 rotate upon the vertical shaft 4, which is rigidly secured to or made integral with the plate 9. 
12' designates a nut screwed on the lower end of said vertical shaft to hold same in position and also as a means of strengthening the entire device. The two sections of the tongue are brought together at the outer end and so held in position by means of the bolts 13, to which are secured the plates 14, on which is pivotally mounted the clevis 15. The tongue is reinforced by the rod 16, which is secured to the boxing or journal plate 17 and runs between the two sections of the tongue to the outer end thereof, where one end of said rod is bent at right angles and holds in place a plate 18 on the end of said tongue.

In operation the driver stands upon one end of the footboard, thus depressing that side of the scraping and cutting tool which is drawn along the ground. The side thus depressed comes in contact with the soil and causes a slow rotation of the scraping and cutting tool, which, coming in contact with weeds and undesirable growth, breaks down, cuts, and scrapes the same from the soil in such manner as to remove root and branch without unduly tearing up the earth.

Having thus described my invention, what I claim as new, and desire to secure by Letters Patent, is—

1. A weeder comprising an angular scraping and cutting tool, a plurality of braces secured thereto, a vertical shaft mounted on the braces, and a platform rotatably mounted on the shaft, substantially as described.

2. A weeder comprising a horizontal scraping and cutting tool, angle-irons secured thereto, braces mounted on the angle-irons and forming a framework, a vertical shaft mounted in the framework, a platform, and tongue mounted on the platform, said platform and tongue being journaled in bearings on the vertical shaft, substantially as described.

In testimony whereof I hereunto affix my signature in presence of two witnesses.

ARNOLD JAKEL.

Witnesses:
 HERMANN JAKEL,
 JOHN BAYNE.